United States Patent [19]
Saxl et al.

[11] 3,865,415
[45] Feb. 11, 1975

[54] SAFETY SYSTEMS

[75] Inventors: Karel Saxl, Sutton Coldfield; George Hall, Birmingham, both of England

[73] Assignee: Imperial Metal Industries (KYNOCH) Limited, Warwickshire, England

[22] Filed: Oct. 26, 1973

[21] Appl. No.: 410,093

[30] Foreign Application Priority Data
Nov. 17, 1972  Great Britain.................... 53185/72

[52] U.S. Cl....................... 293/86, 293/88, 188/1 C
[51] Int. Cl.............................................. B60r 19/06
[58] Field of Search ...... 293/70, 85, 86, 88, DIG. 3; 188/1 C; 267/139

[56]  References Cited
  UNITED STATES PATENTS

| | | | |
|---|---|---|---|
| 1,439,209 | 12/1922 | Watson | 188/1 C |
| 1,503,049 | 7/1924 | Jezek | 293/85 |
| 3,482,653 | 12/1969 | Shin Maki et al. | 293/70 |
| 3,717,224 | 2/1973 | Leach et al. | 293/88 |
| 3,734,554 | 5/1973 | Schwabenlender | 293/88 |

Primary Examiner—M. Henson Wood, Jr.
Assistant Examiner—Robert Saifer
Attorney, Agent, or Firm—Cushman, Darby & Cushman

[57]  ABSTRACT

An energy absorbing system for a motor vehicle comprising a bumper, two energy absorbing devices interconnecting the bumper and the vehicle, the devices being angled apart from one another in a direction away from the vehicle, the connection between the bumper and the devices permitting movement of the ends of the devices towards one another on movement of the bumper towards the vehicle; the devices are preferably extrusion devices in which energy is absorbed by extrusion of a slug through a restricted orifice by means of a ram.

15 Claims, 7 Drawing Figures

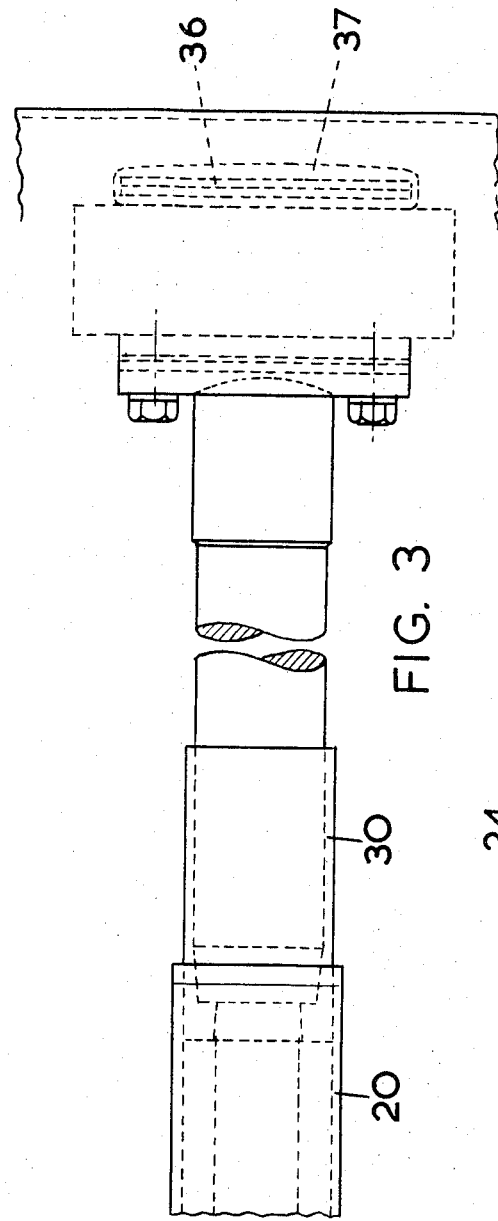
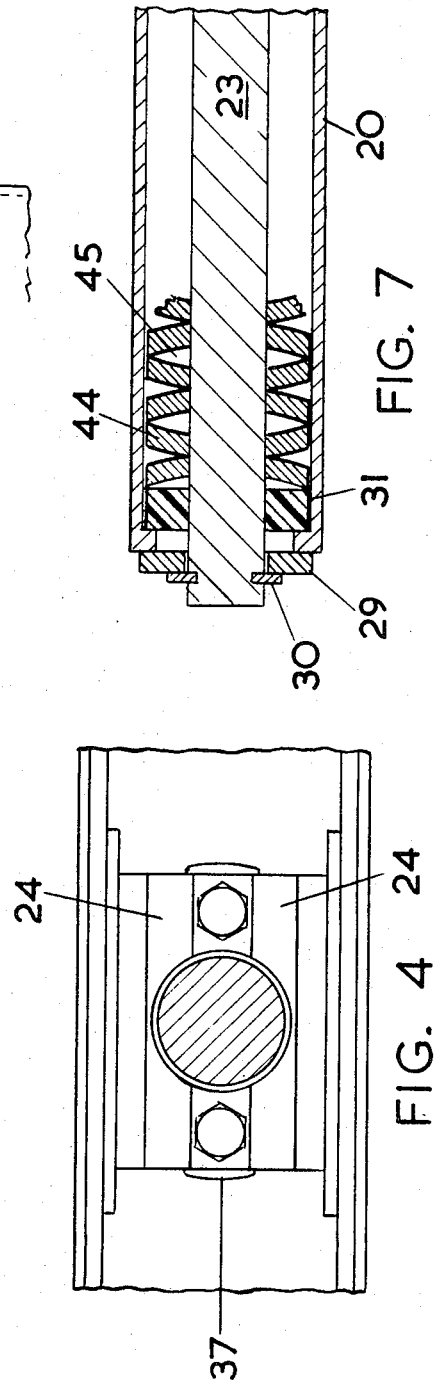

//3,865,415//

SAFETY SYSTEMS

BACKGROUND OF THE INVENTION

This invention relates to energy absorbing systems for motor vehicles.

Motor vehicles have for many years had bumpers which have often been bolted directly onto the body, and which provide very little protection to the body. The demand for an energy absorbing bumper system has been stimulated by the demands of American regulations which require bumper systems to withstand impacts of up to 5mph. Since the bumpers are, obviously, placed at the extremities of the vehicle, and, consequently, a long way from the centre of gravity of the vehicle, they adversely affect the handling of the vehicle. The weight of the bumper is advantageously as low as possible, and in this context it is noted that liquid filled bumpers, in which energy is absorbed by forcing liquid under pressure through an orifice, are necessarily heavier than unfilled bumpers.

SUMMARY OF THE INVENTION

By the present invention there is provided an energy absorbing system for a motor vehicle having a bumper, the system including two energy absorbing devices interconnecting, in a straight line, spaced attachment points on the vehicle and spaced attachment points on the bumper, the points on the bumper being a greater distance apart than the points on the vehicle so that the devices are angled apart from one another in a direction away from the vehicle, the connections between the bumper and the devices being such that the ends of the devices can move towards one another on movement of the bumper towards the vehicle.

The ends of the devices may be attached to the bumper by resilient means, such as a rubber block or blocks. The resilient means may be preloaded by the bumper being moved towards the vehicle, the resilient means being maintained in the preloaded position by means of a strap or straps. The energy absorbing device may include an extrudable slug which is extruded through a restricted orifice by means of a ram. The extrudable slug may be of a plastics material, the ram may have a plurality of diameters.

The plastics material may include voids. The voids may be grooves, such as circumferential grooves. The plastics material may have differing resistances to deformation along its length. There may be a plastics sleeve surrounding at least part of the ram. The plastics material may be in the form of a series of Belleville washers.

The device may be angled between 3° and 30°, preferably between 5° and 30°, and preferably 7° or 15° to the longitudinal axis of the vehicle.

BRIEF DESCRIPTION OF THE DRAWINGS

By way of example only, embodiments of the present invention will now be described with reference to the accompanying drawings, of which:

FIG. 3 is a plan view of the device of FIG. 2;

FIG. 4 is a cross-section along the line IV—IV of FIG. 2;

FIG. 7 is a cross-section of an alternative form of device.

DESCRIPTION OF THE PREFERRED EMBODIMENTS

Figure 1:
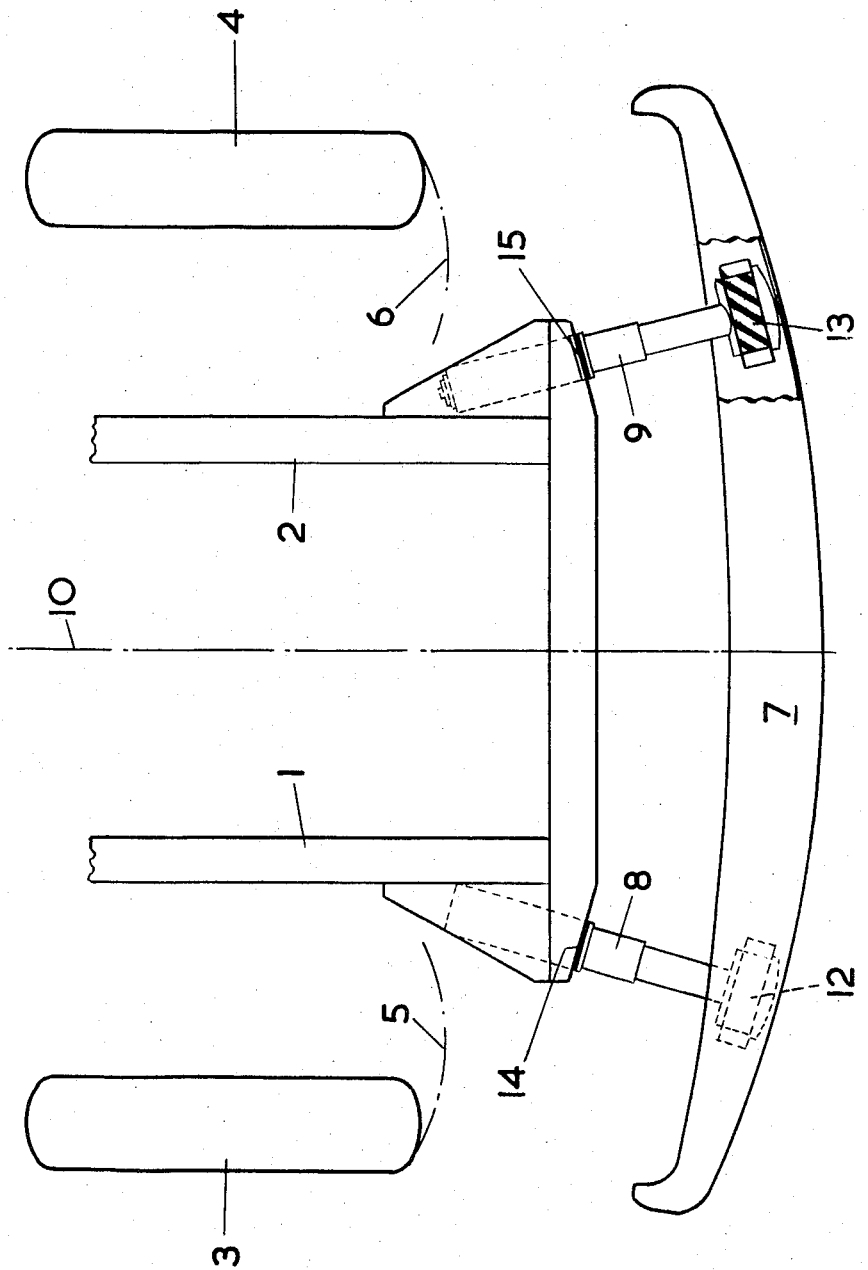
FIG. 1 is a diagrammatic plan view of a vehicle incorporating two devices.

Referring initially to FIG. 1, which is a diagrammatic plan view of vehicle incorporating two devices; the vehicle has a pair of forwardly extending reinforced box girder members 1, 2 which are either part of a separate chassis or which can be part of a sub-frame used to support the engine by conventional mountings not shown. Alternatively, the box girders 1 and 2 may be specifically provided on the vehicle for the mounting of the bumper assembly in which case the girders will be mounted in such a manner as to be able to withstand high loads. On either side of the girders 1 and 2, is shown a pair of wheels 3 and 4 which move along arcs 5 and 6 for the purposes of steering the vehicle. Because the wheels have to have a sufficiently good lock to enable reasonable turning circles to be available, this limits the spacing at which the girders 1 and 2 can be spaced. Obviously, the vehicle itself, which is wider than the width between the wheels 3 and 4, needs a bumper 7 of the same width as or even greater width than the vehicle.

It has been proposed to have an energy absorbing system in which hydraulic devices extend directly out from the girders 1 and 2 to contact the bumper 7. However, in such a case the distance between the attachment points of the hydraulic devices on the bumper is relatively small compared with the width of the bumper. As a result of this, the bumper needs to be very strong to avoid bending when in a collision if the impact occurs at its ends. Since the bumper is fixed to the forward extremity of the vehicle, it has an adverse effect on the handling of the vehicle since ideally the weight of the vehicle should be concentrated near its centre of gravity, and a heavy bumper is not desirable.

The vehicle illustrated in FIG. 1 has a pair of energy absorbing devices 8 and 9 which are angled at 15° to the centre-line longitudinal axis 10 of the vehicle and consequently the points of attachment of the devices to the bumper 12 and 13 are spaced further apart than the points of attachment 14 and 15 of the devices to the vehicle. The devices are attached to the vehicle rigidly. If the vehicle is in a collision, the bumper moves backwards relative to the vehicle and consequently the ends of the devices at their points of attachment to the bumper 12 and 13 move towards one another. This is made possible by fixing the devices to the bumper by means of resilient rubber blocks which allow the ends of the devices to move relatively towards each other.

Figure 2:
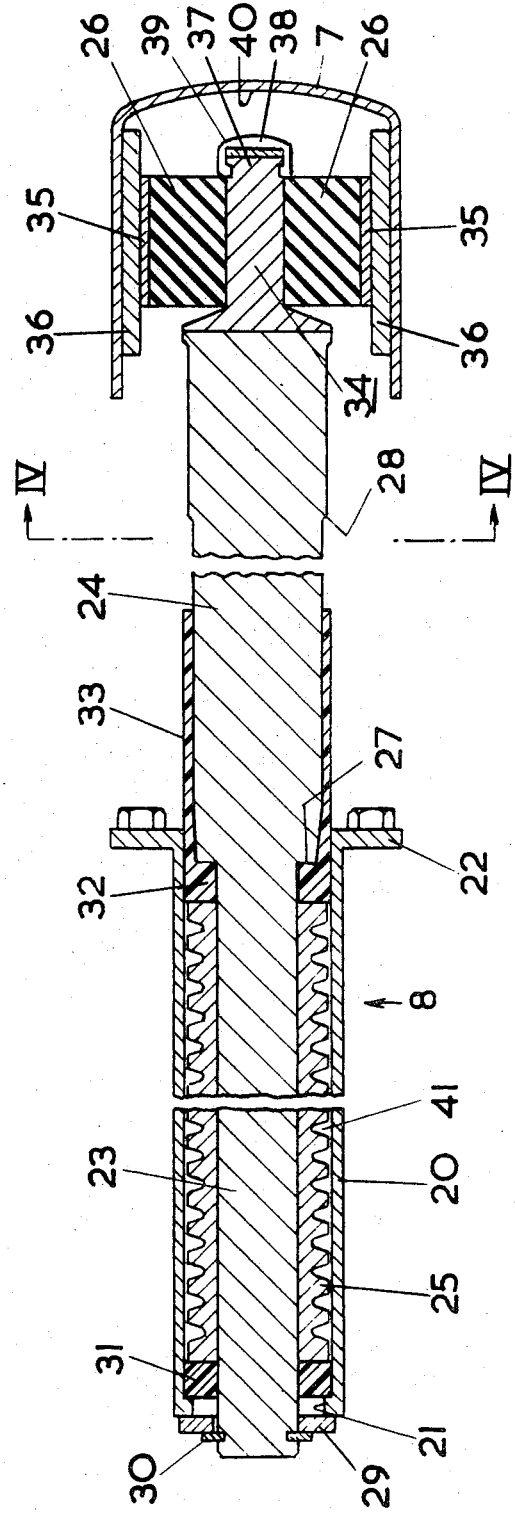
FIG. 2 is a cross-section of a device and bumper.
Figure 6:
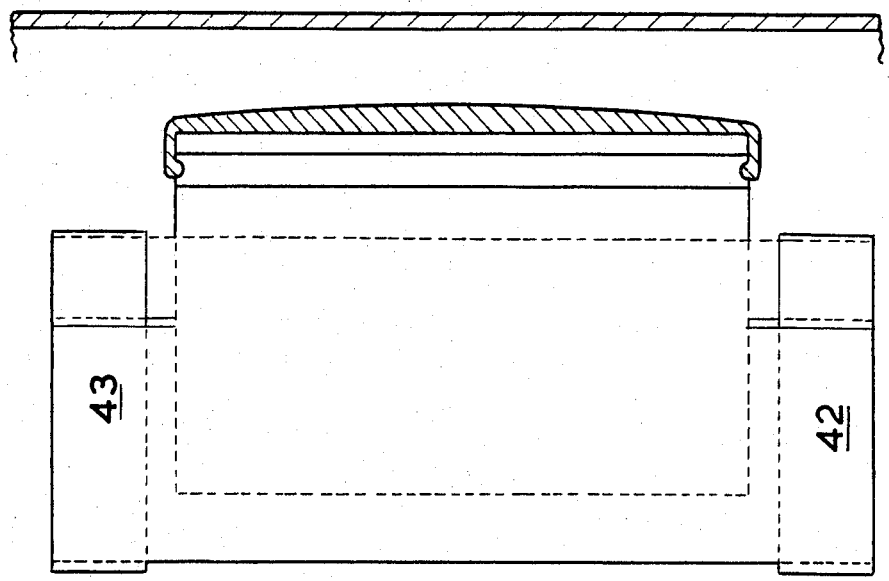
FIG. 6 is a plan view of the head of FIG. 5.
Figure 5:
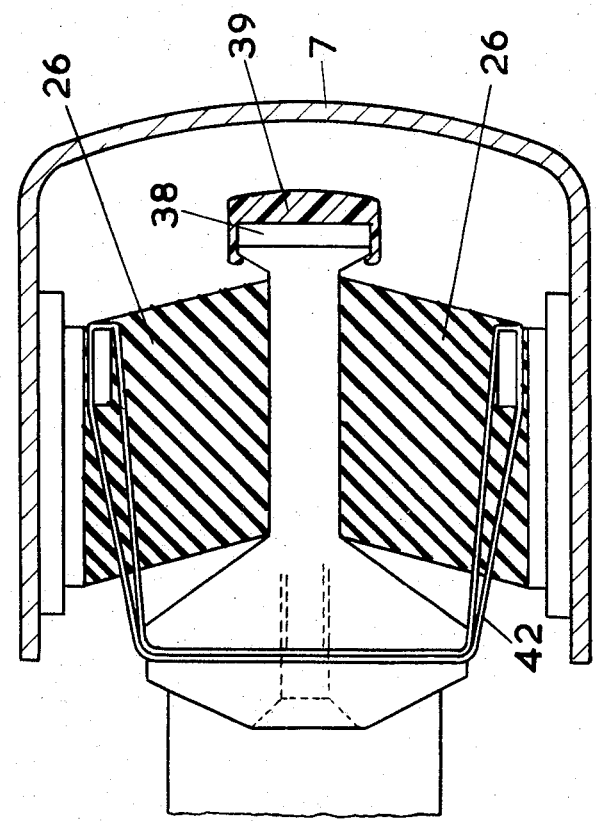
FIG. 5 is an enlarged view of a modified head.

Referring to FIG. 2, the device 8 comprises a cylinder 20 open at both ends but having a restricted opening at one end and a flange 22 at the other. It contains a mandrel 23, a part of a ram 24 and a plastics material sleeve 25. The ram 24 has a head extending into the bumper 7 where it is attached to the bumper by means of rubber blocks 26. The ram has on it a first working surface 27 and a second working surface 28. The mandrel is held in the assembled position by means of a washer 29 and circlip 30 which stop the mandrel being withdrawn from the cylinder 20. The assembly may involve the preloading of the sleeve 25. Adjacent the washer 29 is a ring of hard plastics 31 and similarly at the other end of the plastics sleeve 25 is a further ring of hard plastic 32 which has integral with it a sleeve of plastic 33 which extends over a part of the surface of the ram 24 which is outside of the cylinder 20.

To increase the resistance of the device to side loading, the cylinder 20 could be extended over the plastics sheath 33. This would mean that the ram 24 would be even more securely supported than the arrangement illustrated in FIG. 2.

The head of the ram 24 has bolted to it a flat spade end 34 which is positioned on the vehicle horizontally. The spade end 34 has secured to it the pair of rubber blocks 26, one on either face of the spade end. Stuck to the rubber blocks 26 on their free upper and lower faces is a pair of metal strips 35 which are secured to metal slabs 36 which are, in turn, secured to the bumper 7. The leading edge 37 of the spade 34 has a layer 36 of a low coefficient of friction material such as polytetrafluoroethylene covered by means of a protective plastic shield 39.

In the event of a collision, the bumper 7 moves initially by deforming the blocks 26 until the inside face 40 of the bumper contacts the sheath 39. Further movement of the bumper compresses the plastics sleeve 25 to fill the voids 41 in the sleeve, which are formed by a series of corrugations in the sleeve. Should the load then be released, the plastics material sleeve 25 restores its original shape as do the rubber blocks 26. In the event of the load being removed before the sleeve 25 is compressed, the rubber blocks 26 return themselves to the position shown in FIG. 2.

If the load increases beyond that necessary to fill the voids 41, the hard plastic 31 and the hard plastic 32 start to be extruded followed by extrusion of the sleeve 25, and this extrusion is carried out by the action of the face 27. As the ram moves through the cylinder 20, a thin sheath of plastics material remains, of the same thickness as the thickness of the portion 33. If the face 27 has passed completely through the cylinder 20, the face 28 further extrudes the remaining material to give a further distance of movement with a significant energy absorption.

In the event of an angled impact in which the bumper 7 is hit a glancing blow, it can move relative to the spade ends 34 by virtue of the resilience of the rubber blocks 26. The polytetrafluoroethylene layer 38 enables the inside face 40 of the bumper 7 to move relatively easily without tearing the devices from the vehicle. Because the mandrel 23 extends all the way through the cylinder 20 and is supported therein by the plastic sleeve 25, it is very resistant to side forces and can retain its integrity under a high side loading.

The polytetrafluoroethylene layer 38 and the cover 39 could be replaced by a rubber block which would interconnect the leading end 37 and the inner surface 40. In the event of an angled impact, the rubber block is placed under shear loading, and this movement can be smoothly accommodated.

In a further embodiment of the invention, the rubber blocks 26 are preloaded by means of a pair of straps 42, 43 so that the bumper 7 is forced and maintained in a direction towards the vehicle. The result of preloading the rubber blocks is that the bumper does not move in the case of very minor accident, but when it does move it is capable of absorbing more energy than the non-preloaded rubber blocks. The straps 42 and 43 can be made from any suitable material such as polypropylene, nylon or metal as required.

In yet a further embodiment of the invention the plastics sleeve 25 is in the form of a series of Belleville washers 44 which are facing one another as shown in FIG. 7. When these Belleville washers are compressed to fill the voids 45, they do so in resilient manner and the shape of the Bellville washers can be so arranged that the load can occur in a straight line relationship against distance, or in a parabolic or a sinusoidal relationship. Again if the compression of the plastic Belleville washers 44 carries on beyond the point at which the voids 45 are all filled then extrusion of the plastic assembly takes place. Alternatively, if the load is removed before the extrusion stage, then the Belleville washers restore themselves to their normal position.

Although the above description has been only concerned with solid energy absorbing devices, hydraulic devices could be used with the same type of fixing on the bumper.

In a further modification of the invention, the movement of the ends of the devices relative to the bumper can be utilised to enable a further energy absorbing device to be mounted on the bumper with one end connected to the bumper and the other end connected to the end of the device. When the bumper is moved towards the vehicle and the end of the device moves relative to the bumper, then the energy absorbing device is activated to absorb energy and further slow down the rate of travel of the bumper relative to the vehicle.

Although FIG. 1 only illustrates two devices on the vehicle, there is, of course, no reason why a third or even fourth device could not be included in which case the devices would be positioned on the centre-line 10 of the vehicle or preferably symmetrically disposed on either side of the centre-line.

We claim:

1. An energy absorbing system for a motor vehicle having a bumper, the system including two energy absorbing devices interconnecting, in a straight line, spaced attachment points on the vehicle and spaced attachment points on the bumper, the points on the bumper being a greater distance apart than the points on the vehicle so that the devices are angles apart from one another in a direction away from the vehicle, the connections between the vehicle and the devices being rigid, and the connections between the bumper and the devices being such that the bumper ends of the devices can move towards one another in a line transverse to the center line of the vehicle on movement of the bumper towards the vehicle.

2. A system as claimed in claim 1 in which the devices are attached to the bumper by resilient means, such as a rubber block or blocks.

3. A system as claimed in claim 2 in which the resilient means are preloaded by the bumper being moved towards the vehicle, the resilient means being maintained in the preloaded position by means of a strap or straps.

4. A system as claimed in claim 1 in which the energy absorbing device includes an extrudable slug which is extruded through a restricted orifice by means of a ram.

5. A system as claimed in claim 4 in which the extrudable slug is of a plastic material, the ram having a plurality of diameters.

6. A system as claimed in claim 5 in which the plastic material includes voids.

7. A system as claimed in claim 6 in which the voids are grooves, such as circumferential grooves.

8. A system as claimed in claim 5 in which the plastic material has differing resistances to deformation along its length.

9. A system as claimed in claim 5 in which the plastic material is in the form of a series of Belleville washers.

10. A system as claimed in claim 4 in which there is a plastic sleeve surrounding at least part of the ram.

11. A system as claimed in claim 1 in which the device is angled between 3° and 30° to the longitudinal axis of the vehicle.

12. A system as claimed in claim 11 in which the angle is between 5° and 30°.

13. A system as claimed in claim 12 in which the angle is 7°.

14. A system as claimed in claim 12 in which the angle is 15°.

15. A system as claimed in claim 5 in which there is a plastic sleeve surrounding at least part of the ram.

* * * * *